United States Patent
Tachiiri et al.

(10) Patent No.: US 6,782,978 B2
(45) Date of Patent: Aug. 31, 2004

(54) ELECTRICAL VEHICLE PARKING BRAKE DEVICE

(75) Inventors: Yoshikazu Tachiiri, Chiryu (JP); Wataru Tanaka, Anjo (JP); Asao Kozakai, Anjo (JP)

(73) Assignee: Aisin Seiki Kabushiki Kaisha, Kariya (JP)

( * ) Notice: Subject to any disclaimer, the term of this patent is extended or adjusted under 35 U.S.C. 154(b) by 0 days.

(21) Appl. No.: 10/253,472

(22) Filed: Sep. 25, 2002

(65) Prior Publication Data

US 2003/0070885 A1 Apr. 17, 2003

(30) Foreign Application Priority Data

Sep. 25, 2001  (JP) ........................................ 2001-292476

(51) Int. Cl.$^7$ .............................................. F16D 65/36
(52) U.S. Cl. ...................... 188/157; 188/158; 188/162; 188/72.3; 188/72.8
(58) Field of Search ................................. 188/2 D, 72.1, 188/72.3, 72.7, 72.8, 156, 157, 158, 265, 171, 161, 162; 74/500.5, 501.5 R, 501.6, 529, 540

(56) References Cited

U.S. PATENT DOCUMENTS

| | | | | |
|---|---|---|---|---|
| 3,578,759 A | * | 5/1971 | Yamazaki | .................... 74/540 |
| 4,561,527 A | * | 12/1985 | Nakamoto et al. | .......... 188/2 D |
| 4,817,463 A | * | 4/1989 | Cameron | .................. 188/2 D |
| 4,892,014 A | * | 1/1990 | Morell et al. | ................ 192/222 |
| 5,004,077 A | * | 4/1991 | Carlson et al. | ............. 188/2 D |
| 5,485,764 A | * | 1/1996 | Sugimoto et al. | ........... 188/2 D |
| 5,542,513 A | * | 8/1996 | Reyes | ......................... 192/222 |
| 6,213,259 B1 | | 4/2001 | Hanson et al. | |
| 2002/0027386 A1 | * | 3/2002 | Yanaka et al. | .................. 303/3 |
| 2003/0132068 A1 | * | 7/2003 | Revelis et al. | .............. 188/158 |

FOREIGN PATENT DOCUMENTS

| | | | | |
|---|---|---|---|---|
| JP | 05170067 A1 | * | 7/1993 | ............. B60T/7/12 |
| JP | 2001106058 A1 | * | 4/2001 | ........... B60T/17/22 |
| JP | 2003254367 A1 | * | 9/2003 | ........... F16D/65/34 |

\* cited by examiner

*Primary Examiner*—Thomas Williams
(74) *Attorney, Agent, or Firm*—Burns, Doane, Swecker & Mathis, L.L.P.

(57) ABSTRACT

An electrical vehicle parking brake device capable of reducing the size towards a cable shaft and improving the degree of freedom of mounting in a vehicle is provided for the electrical vehicle parking brake device of controlling the braking force to a wheel due to the driving power of a motor which is transmitted by way of a cable at the time of parking the vehicle. At the time of parking the vehicle, in the electrical vehicle parking brake device of controlling the braking force to the wheel due to the driving power of a motor which is transmitted by way of a gear mechanism and a cable at the time of parking the vehicle, an end gear series of the gear mechanism is structured of an external gear and an internal gear, the external gear uses a K-H-V type planetary gear mechanism in which external gear turns to the extent of a difference between the numbers of teeth between the external gear and the internal gear by making one revolution in an inner circumference side of the internal gear and also the cable is wound up in a circular shape in the external gear.

7 Claims, 9 Drawing Sheets

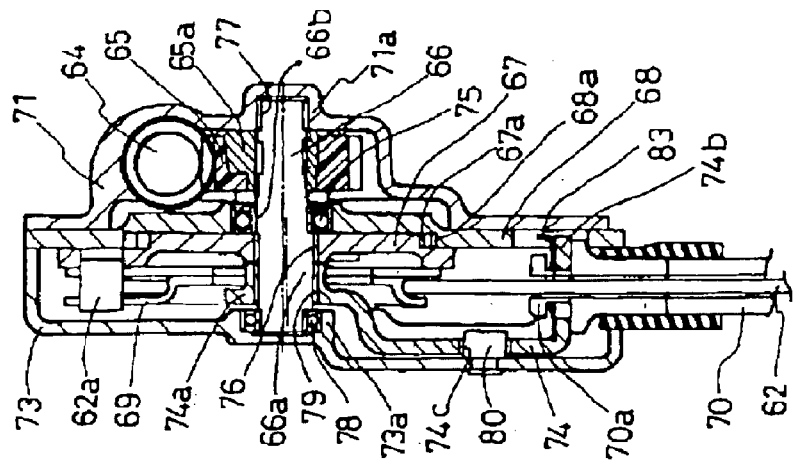
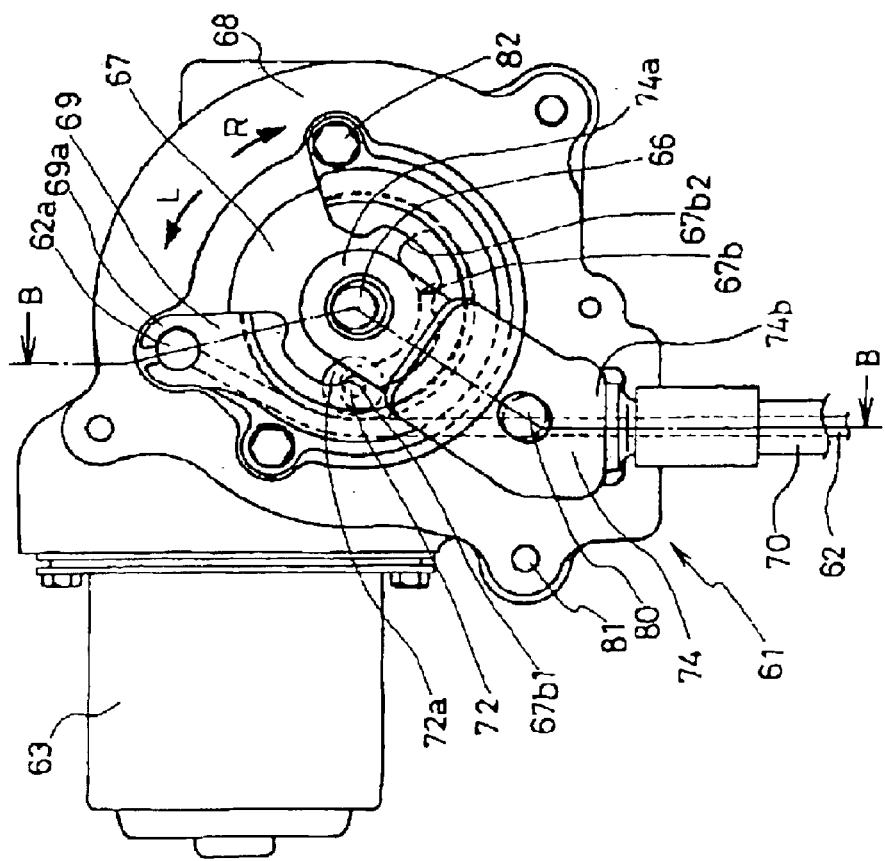
Fig. 3a
Fig. 3b

ELECTRICAL VEHICLE PARKING BRAKE DEVICE

BACKGROUND OF THE INVENTION

1. Field of the Invention

This invention generally relates to a parking brake device, more particularly to an electrical vehicle parking brake device for controlling braking force for wheels by the driving power of a motor which is transmitted by way of a gear mechanism and a cable.

2. Description of the Related Art

Conventionally, with respect to an electrical vehicle parking brake device, technology in which a cable of a parking brake is pulled using the driving power of the motor so as to cause suitable braking force at the time of functioning is proposed. For example, in the U.S. Pat. No. 6,213,259, the electrical vehicle parking brake device, which includes a moving screw turning by the driving power of the motor and pulls the cable directly due to rotation of the moving screw as well as a nut side member of the moving screw is connected to the cable, is disclosed.

However, the above-mentioned conventional electrical vehicle parking brake device requires a length in the axial direction longer than a length of adding allowance to a maximum stroke of the cable as well as a moving screw and a nut side member Thus, the whole electrical vehicle parking brake device requires a length of adding allowance to the length at least two times as long as the maximum stroke of the cable for only the moving screw and a mechanical portion of the nut side member, and further increases a space for mounting in a vehicle.

Therefore, the present invention is invented in view of the above-mentioned backgrounds. At the time of parking the vehicle, in the electrical vehicle parking brake device for controlling the braking power for wheels by the driving power which is transmitted by way of the cable, the technical purpose of the present invention is to provide an electrical vehicle parking brake device in which the size thereof can be reduced in the cable axial direction and the degree of freedom of mounting in the vehicle can be increased.

SUMMARY OF THE INVENTION

It is an object of the present invention to provide an improved electrical vehicle parking brake device which pertains to reduce the cable axial direction.

In order to achieve the above-mentioned object, the present invention is characterized in that, in an electrical vehicle parking brake device for controlling braking force to a wheel by driving power of a motor transmitted by way of a gear mechanism and a cable, an end gear series of the gear mechanism includes a differential gear mechanism and winds up the cable in a circular way.

BRIEF DESCRIPTION OF THE DRAWING FIGURES

The foregoing and additional features and characteristics of the present invention will become more apparent from the following detailed description considered with reference to the accompanying drawing figures wherein:

FIGS. 3A and 3B illustrate the structure of the electrical parking brake actuator of a second embodiment of the present invention;

DETAILED DESCRIPTION OF THE INVENTION

The embodiments of the present invention are explained hereinafter with reference to drawings.

Figure 1:
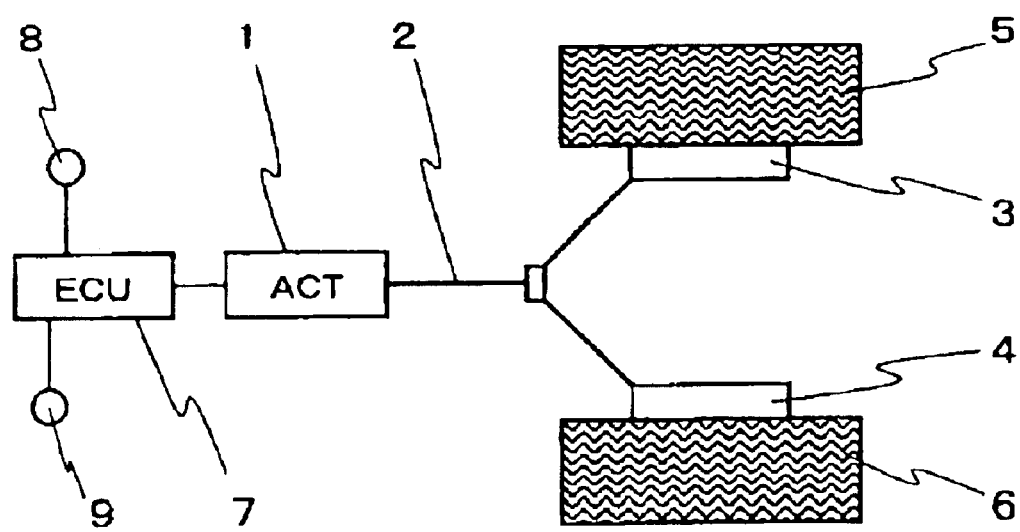
FIG. 1 illustrates the whole structure of a first embodiment of an electrical vehicle parking brake device of the present invention.

FIG. 1 illustrates the whole structure of the first embodiment of an electrical vehicle parking brake device of the present invention. In FIG. 1, an electrical parking brake actuator (ACT) 1 is connected to parking brake units 3 and 4 through a cable 2. These parking brake units 3 and 4 are installed in wheels 5 and 6 respectively. The wheel 5 designates a wheel in the rear right hand side from the viewpoint of driver's seat. The wheel 6 designates a wheel of the rear left hand side (the front wheels are omitted). The electrical parking brake actuator 1 includes a gear mechanism utilizing a differential gear mechanism in a motor and an end gear series. The cable 2 is wound in a circle by the driving power of the motor, a braking force is given to the wheels 5 and 6, the cable 2 is wound back, and then the braking force is released.

The electrical parking brake actuator 1 is controlled by an electronic control device (ECU) 7 and an operation switch 8 and an indicating lamp 9 are connected to this electronic control device.

An operation signal is sent to the electronic control device 7 by operation switch 8 by the driver's operation, the driving power of the electrical parking brake actuator 1 is controlled and an automatic mode is selected (the electrical parking brake actuator 1 is automatically controlled using a signal from the speed sensor of the wheels, not shown, and an on-off switch of a brake pedal). A control condition of the electrical parking brake actuator 1 and an alarm at the time of identifying an abnormality are displayed in the indicating lamp 9.

Next, the structure of the electrical parking brake actuator according to the present invention is concretely explained hereinafter in detail.

Figure 2A:
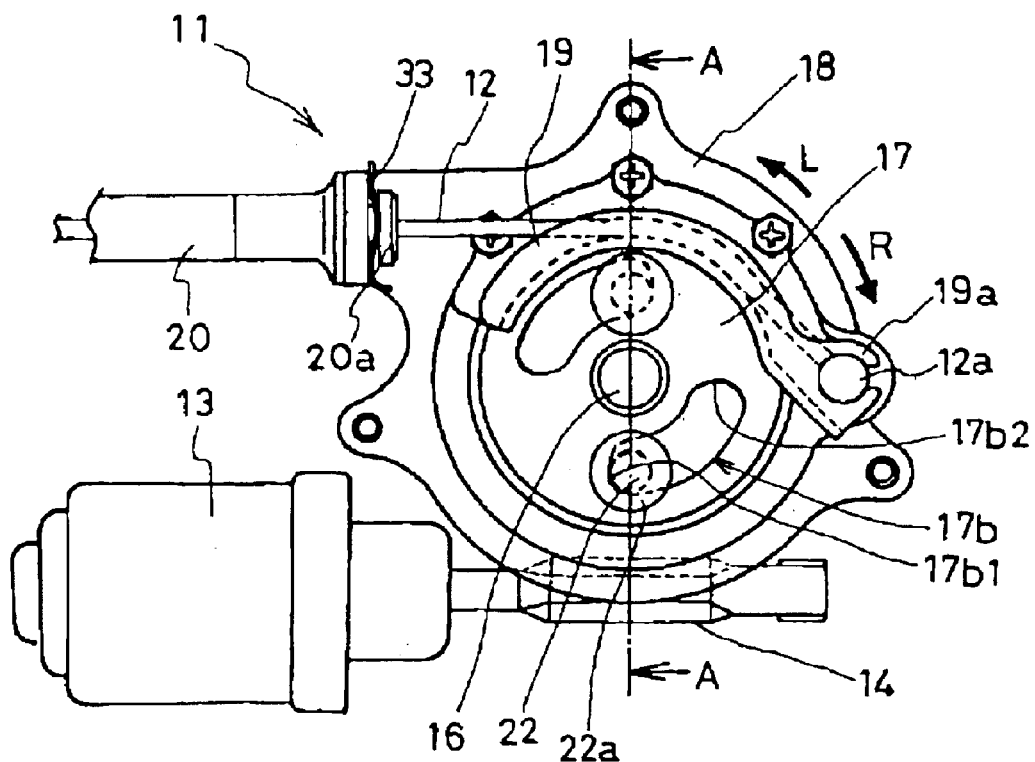
FIGS. 2A and 2B illustrate the structure of an electrical parking brake actuator of the first embodiment of the present invention.
Figure 2B:
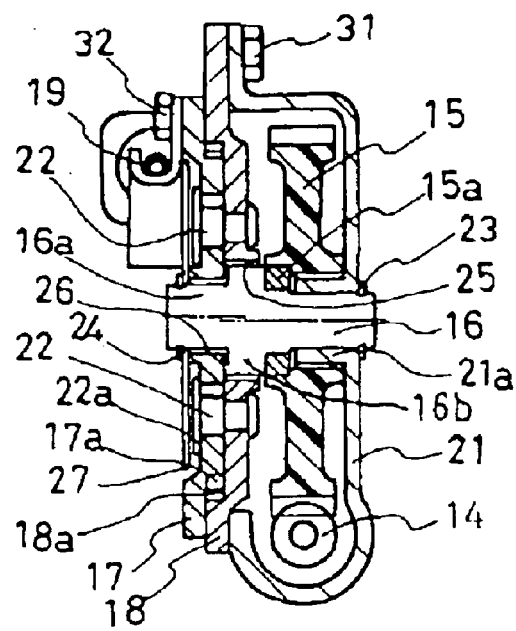

At first, the first embodiment is explained. FIGS. 2A and 2B illustrate the structure of an electrical parking brake actuator 11 of the first embodiment of the present invention. FIG. 2A is a top plane view thereof (a case 21 and a cover 27, etc. are omitted). FIG. 2B is an A—A sectional view of FIG. 2A. In FIG. 2A, in the electrical parking brake actuator 11, the driving power of a motor 13 is transmitted to an eccentric shaft 16 via a worm gear 14 and a worm wheel 15. Further, an external gear 17 engaged in an eccentric portion 16a of the eccentric shaft 16 is turned in an inner circumferential side of an internal gear 18 and a cable 12 connected to the external gear 17 is wound up or can be wound back.

The motor 13 is a conventional DC motor, and can rotate in the normal rotational direction (the direction for giving the braking force to the wheel) and in the reverse rotational direction (the direction for releasing the braking force to the wheel). The worm gear 14 is connected to a rotational shaft of the motor 13.

The worm gear 14 is made of metal and engages with the worm wheel 15. The worm wheel 15 rotates in the arrow L direction (counterclockwise direction in FIG. 2A) by way of the worm gear 14 when the motor 13 rotates in the normal rotational direction and rotates in the arrow R direction (clockwise direction in FIG. 2A) when the motor 13 rotates in a reverse rotational direction. When the motor 13 does not function, each gear's condition at the time of ending function due to friction between the worm gear 14 and the worm wheel 15 is kept. The worm wheel 15 is made of resin material and rotates integrally with the eccentric shaft 16 about a fixed built-in serration part 15a made of metal.

The eccentric shaft 16 is rotatably supported by a cylindrical part 21a of the case 21, and the movement in the axial direction thereof is controlled by a ring 24 fixed in the cover 27 and another ring 23 fixed in the side of the case 21. In a coaxial part 16b of the eccentric shaft 16, a center hole of the internal gear 18 is engaged by way of a shaft bearing 25 in order for a rotation center of the internal gear 18 to become coaxial with a rotation center of the worm wheel 15. In an eccentric part 16a of the eccentric shaft 16, a center hole of the external gear 17 is engaged by way of a shaft bearing 26 in order for a rotation center of the external gear 17 to deviate to a predetermined extent from a rotation center of the internal gear 18.

The internal gear 18 is made of metal, and a gear part 18a is formed using a press molding. The gear part 18a of the internal gear 18 is structured so as to engage with a teeth part 17a of the external gear 17. The outer circumferential portion of the internal gear 18 is fixed to the case 21 by a plurality of screws 31. As a result, the internal gear 18 cannot rotate (i.e., a rotation relative to the case 21 and the motor 13).

The external gear 17 is also made of metal, and the teeth part 17a is formed using a press molding. The external gear 17 penetrates a hole portion 17b of the external gear 17 and the movement in the axial direction is controlled by the internal gear 18 and a flange part 22a of a stopper pin 22 (2 pieces in the present first embodiment) bit and fixed to the internal gear 18.

The diameter of a pitch circle of the internal gear 18 is larger than the diameter of a pitch circle of the external gear 17, and the internal gear 18 has one more tooth than the external gear 17. These external gear 17 and internal gear 18 structure a K-H-V type planetary gear mechanism which rotates to the extent of a teeth difference between the external gear 17 and the internal gear 18 in the reverse direction to the revolving direction by the external gear 17 making one revolution in the inner circumferential side of the internal gear 18. Namely, the K-H-V type planetary gear mechanism is used in the end gear series of the gear mechanism included in the electrical parking brake actuator 11. Concretely, when the eccentric shaft 16 makes one revolution in the arrow L direction, the deviating eccentric part 16a also makes one revolution in the arrow L direction. The external gear 17 rotates to the extent of one tooth in the arrow R direction that is the reverse direction to the rotary direction, when making one revolution in the arrow L direction in the inner circumferential direction of the internal gear 18, at the same time the deviating eccentric part 16a also makes one revolution in the arrow L direction.

In the outer circumferential portion of the external gear 17, a cable guide 19 is fixed by three screws 32. A top portion 12a forming a cylindrical shape provided in one end of the cable 12 is provided in a supporting part 19a positioned in one end of the cable guide 19. Namely, the present device has a structure in which the cable 12 connected to the external gear 17 by way of the supporting part 19a of the cable guide 19 can be wound up or wound back by revolution of the external gear 17 in a circular way along the cable guide 19.

The hole portion 17b of the external gear 17 has a width, in which the stopper pin 22 does not contact due to fluctuation by revolution of the external gear 17, in the radial direction, and also forms a long hole along the circumferential direction. This hole portion 17b also includes a function for controlling range in which the external gear 17 can turn. For example, in the condition of FIG. 2, since a side part 17b1 of one side of the hole portion 17b contacts with the stopper pin 22, the external gear 17 is controlled from furthermore rotating in the arrow L direction (i.e., the cable 12 is wound back and is in a zero point position of a stroke quantity of the cable 12). On the contrary, the external gear 17 is continuously rotated in the arrow R direction (approximately a little less than 90 degrees in the first embodiment of FIG. 2) from this condition, then a side part 17b2 of other side of the hole portion 17b touches with the stopper pin 22, and the rotation of the external gear 17 in the arrow R direction is controlled (i.e., the maximum stroke which can wind up the cable 12 is controlled).

The other end of the cable 12 is connected to the parking, brake units 3 and 4. The cable 12 is covered by a cable cover 20 which can slide inside. In this cable cover 20, its one end 20a is fixed to the outer peripheral portion of the internal gear 18 using a ring 33, and the other end portion is fixed to the parking brake units 3 and 4.

The operation of the electrical vehicle parking brake device with regard to the first embodiment of thus structured present invention is explained. When a signal from the operation switch 8 and the like is sent to the electronic control device 7 and the braking force is given to the wheels 5 and 6, the motor 13 is rotated in a normal turning way (the direction to which the braking force is given), and then the worm gear 14 is rotated. At the same time, the speed of the worm wheel 15 is reduced and the worm wheel 15 is rotated in the arrow L direction. Since the eccentric part 16a of the eccentric shaft 16 fixed to the worm wheel 15 is rotated in the arrow L direction, the external gear 17 is rotated in the inner circumference of the internal gear 18 in the arrow L direction. Due to the revolution of this external gear 17, the speed of the external gear 17 is reduced in the arrow R direction to the extent of one tooth by each revolution and rotated. Therefore, the cable 12 is wound up, the parking brake units 3 and 4 function, and the braking force to the wheels 5 and 6 is given. If it is attempted to remove its braking force, the motor 13 is rotated in the reverse direction (the direction to which the braking force to the wheels is reduced) and then each gear is rotated in each reverse direction (or revolution). Therefore, the cable 12 is wound back, and the braking force to the wheels 5 and 6 is released.

As explained in the above-mentioned description, in the electrical vehicle parking brake device with regard to the first embodiment of the present invention, since the end gear series of the gear mechanism included in the electrical parking brake actuator 11 uses the differential gear mechanism (the external gear 17 and the internal gear 18) and further winds up the cable 12 in a cylindrical way, thus it is made possible to reduce the size in the cable shaft direction and further the degree of freedom of mounting in the vehicle can be improved. Further, even if the maximum stroke of the cable 12 is not the same according to the required specification of the vehicle, it is not required to change the size of the electrical parking brake actuator 11. Further, since the differential gear mechanism is the K-H-V type planetary gear mechanism, the reduction gear ratio can be increased and also the more the ratio of engaging the gears increases the more the strength of the gears can increase.

Next, the second embodiment is explained. FIGS. 3A and 3B illustrate the structure of the electrical parking brake actuator 61 of the second embodiment of the present invention. FIG. 3A is a top plane view (a case 73 is omitted). FIG. 3B is a B—B sectional view of FIG. 3A. In FIG. 3, for the electrical parking brake actuator 61, the main structure thereof is the same as the first embodiment, the driving power of the motor 63 is transmitted to an eccentric shaft 66 by way of a worm gear 64 and a worm wheel 65. Further, an external gear 67 engaged with an eccentric part 66a of the eccentric shaft 66 is revolved in an inner circumferential side of an internal gear 68, and the structure in which a cable 62 connected to the external gear 67 can be wound up or back is designed. In the second embodiment, with regard to the first embodiment, a connecting member 74 is added. One end portion 74a of this connecting member 74 is engaged with the eccentric part 66a, and the other end portion 74b extended in the radial direction from the eccentric part 66a is connected to a cable cover 70 covering the cable 62 in a sliding way.

The motor 63 is a conventional DC motor and can rotate in the normal direction (the direction to which the braking force to the wheels is added) and in the reverse direction (the direction to which the braking force to the wheels is removed). The worm gear 64 is connected to the rotary shaft of the motor 63.

The worm gear 64 is made of metal and engages with the worm wheel 65. The worm wheel 65 rotates in the arrow L direction (counterclockwise direction in FIG. 3A) by way of the worm gear 64 when the motor 63 rotates in the normal rotational direction and rotates in the arrow R direction (clockwise direction in FIG. 3A) when the motor 63 rotates in the reverse rotational direction When the motor 63 does not function, each gear's condition at the time of ending function of the motor 63 due to friction between the worm gear 64 and the worm wheel 65 is maintained. The worm wheel 65 is made of resin material and rotates integrally with the eccentric shaft 66 about a fixed built-in serration part 65a made of metal.

The both ends of the eccentric shaft 66 are fit in a hole 71a of a case 71 and a hole 73a of the case 73 by way of a shaft bearing 77 and a shaft bearing 78 respectively in a rotatable way. In the concentric portion 66b of the eccentric shaft 66, the center hole of the internal gear 68 is engaged by way of the shaft bearing 75 in order for the rotary center point of the internal gear 68 to become concentric with the rotary center point of the worm wheel 65. In the eccentric part 66a of the eccentric shaft 66, the center hole of the external gear 67 is engaged by way of a shaft bearing 76 in order for the rotary center point of the external gear 67 to become eccentric to the extent of predetermined value from the rotary center point of the internal gear 68.

The internal gear 68 is made of metal, and a gear part 68a is formed using a press molding. The gear part 68a of the internal gear 68 is structured so as to engage with a teeth part 67a of the external gear 67. The outer circumferential portion of the internal gear 68 is fixed to the case 71 and the case 73 by a plurality of screws 81. As a result, the internal gear 68 cannot turn completely (i.e., a relative rotation for the case 71 and the motor 63).

The external gear 67 is also made of metal, and the teeth part 67a is formed using the press molding. The external gear 67 penetrates a hole portion 67b of the external gear 67 and the movement in the axial direction is controlled by the internal gear 68 and a flange part 72a of a stopper pin 72 (one piece in the present second embodiment) bit and fixed to the internal gear 68.

The diameter of a pitch circle of the internal gear 68 is larger than the diameter of a pitch circle of the external gear 67, and the internal gear 68 has one more tooth than the external gear 67. These external gear 67 and internal gear 68 structure the K-H-V type planetary gear mechanism which rotates to the extent of a teeth difference between the external gear 67 and the internal gear 68 in the reverse direction to the revolving direction by the external gear 67 which makes one revolution in the inner circumferential side of the internal gear 68. Namely, the K-H-V type planetary gear mechanism is used in the end gear series of the gear mechanism included in the electrical parking brake actuator 61. Concretely, when the eccentric shaft 66 makes one revolution in the arrow L direction, the deviating eccentric part 66a also makes one revolution in the arrow L direction. The external gear 67 rotates to the extent of one tooth in the arrow R direction that is the reverse direction to the revolution direction, when making one revolution in the arrow L direction in the inner circumferential direction of the internal gear 68, at the same time the deviating eccentric part 66a also makes one revolution in the arrow L direction.

In the outer circumferential portion of the external gear 67, a cable guide 69 is fixed by two screws 82. A top portion 62a forming a cylindrical shape provided in one end of the cable 62 is provided in a supporting part 69a positioned in one end of the cable guide 69. Namely, the present device has a structure in which the cable 62 connected to the external gear 67 by way of the supporting part 69a of the cable guide 69 can be wound up or wound back in a circular way along the cable guide 69.

Figure 4:
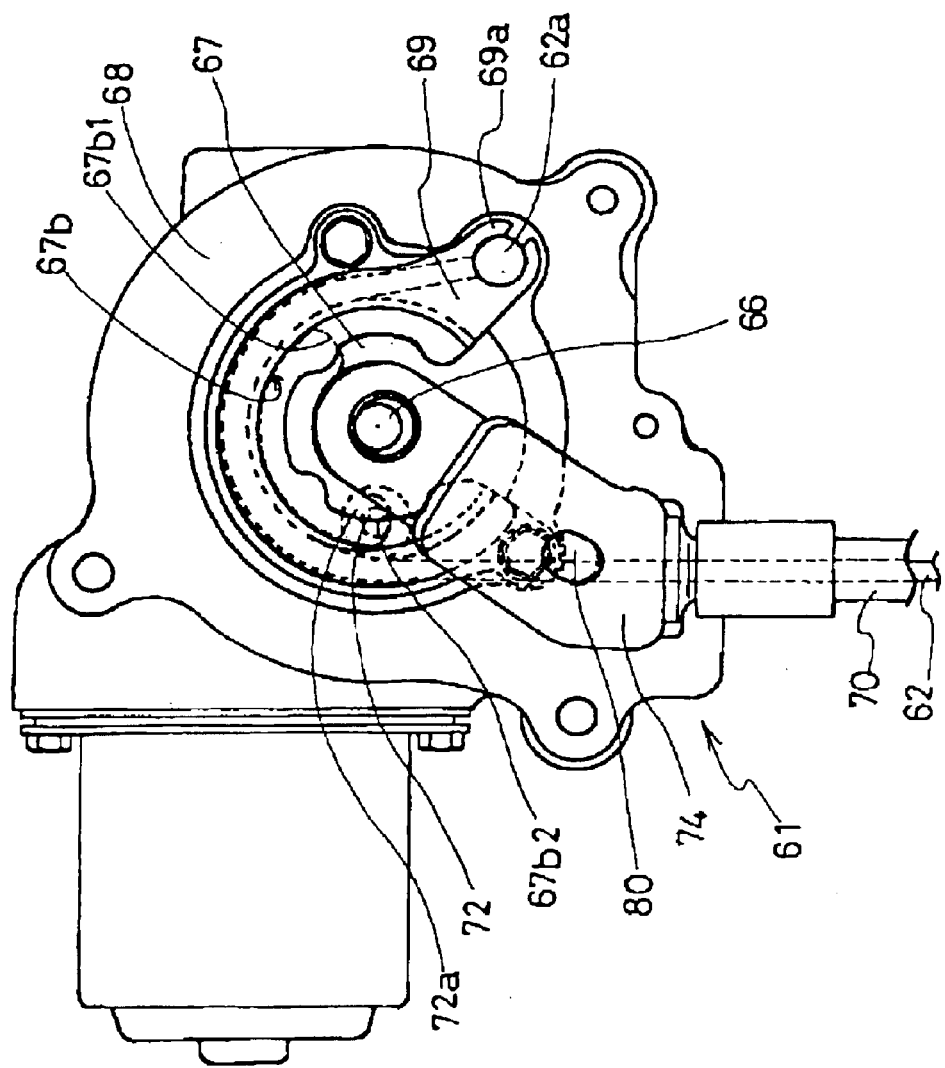
FIG. 4 illustrates a condition in which the cable is wound for a time up to the extent of the maximum stroke in the second embodiment.

The hole portion 67b of the external gear 67 has a width, in which the stopper pin 72 does not contact due to fluctuation by revolution of the external gear 67, in the radial direction, and also forms a long hole along the circumferential direction. This hole portion 67b also includes a function for controlling range in which the external gear 67 can turn. For example, in the condition of FIG. 3, since a side part 67b1 of one side of the hole portion 67b contacts with the stopper pin 72, the external gear 67 is controlled so as not to revolve furthermore in the arrow L direction (i.e., the cable 62 is wound back and is in a zero point position of a stroke quantity of the cable 62). On the contrary, the external gear 67 is continuously rotated in the arrow R direction (approximately a little less than 135 degrees in the second embodiment of FIG. 3) from this condition, as shown in FIG. 4, then a side part 67b2 of other side of the hole portion 67b touches with the stopper pin 72, and the external gear 67 revolving in the arrow R direction is controlled(i.e., the maximum stroke which can wind up the cable 62 is controlled).

The other end of the cable 62 is connected to the parking brake units 3 and 4. The cable 62 is covered by a cable cover 70 capable of sliding the inside. In this cable cover 70, its one end 70a is fixed to the other end portion 74b of the connecting member 74 using a ring 83, and the other end portion is fixed to the parking brake units 3 and 4.

The connecting member 74 is an added structure of the second embodiment to the first embodiment, as one of features. One end portion 74a of the connecting member 74 is engaged with the eccentric part 66a by way of a shaft bearing 79 and the other end portion 74b extending towards the radial direction from the eccentric part 66a is connected to the cable cover 70. Further, a hole portion 74c is provided in the vicinity of the other end portion 74b of the connecting member 74. This hole portion 74c has a long hole along the radial direction, and a guide pin 80 bit and fixed to the case 73 penetrates through this connecting member 74. Therefore, although the connecting member 74 moving in the direction of rotating is controlled in the vicinity of the other end portion 74b, the connecting member 74 is so structured as to move in the radial direction to a certain extent (not less than eccentric value of the eccentric shaft 66).

The operation of the electrical vehicle parking brake device with regard to the second embodiment of thus structured present invention is explained. In the same way as the first embodiment, when a signal from the operation switch 8 and the like is sent to the electronic control device 7 and the braking force is given to the wheels 5 and 6, the motor 63 is rotated in a normal turning way (the direction to which the braking force is given), and then the worm gear 64 is rotated. At the same time, the speed of the worm wheel 65 is decreased and the worm wheel 65 is rotated in the arrow L direction. Since the eccentric part 66a of the eccentric shaft 66 fixed to the worm wheel 65 is rotated in the arrow L direction, the external gear 67 is rotated in the inner circumference of the internal gear 68 in the arrow L direction. Due to the revolution of this external gear 67, the speed of the external gear 67 is reduced in the arrow R direction to the extent of one tooth by each revolution and rotated. Therefore, the cable 62 is wound up, the parking brake units 3 and 4 function, and the braking force to the wheels 5 and 6 is given. If it is attempted to remove its braking force, the motor 63 is rotated in the reverse direction (the direction to which the braking force to the wheels is reduced) and then each gear is rotated in each reverse direction (or revolution). Therefore, the cable 62 is wound back, and the braking force to the wheels 5 and 6 is released.

At this point, the function of the connecting member 74 is explained. When the eccentric shaft 66 rotates, the one end portion 74a engaged with the eccentric part 66a is also rotated. Since the connecting member 74 moving in the rotary direction of the eccentric shaft 66 is controlled by the guide pin 80 penetrating through the hole portion 74c, reciprocating motions are performed in the radial direction in the same way as the so-called slider crank mechanism. Namely, the connecting member 74 makes one reciprocating motion in the radial direction while the eccentric shaft 66 makes one revolution. Further, the other end portion 74b is connected to its one end 70a of the cable cover 70, thus the cable cover 70 also works together with the connecting member 74 and makes reciprocating motions in the radial direction. Therefore, while the external gear 67 engaging with the eccentric part 66a makes one revolution, the vicinity of its one end 70a of the cable cover 70 makes one reciprocating motion in the radial direction.

Figure 5A:
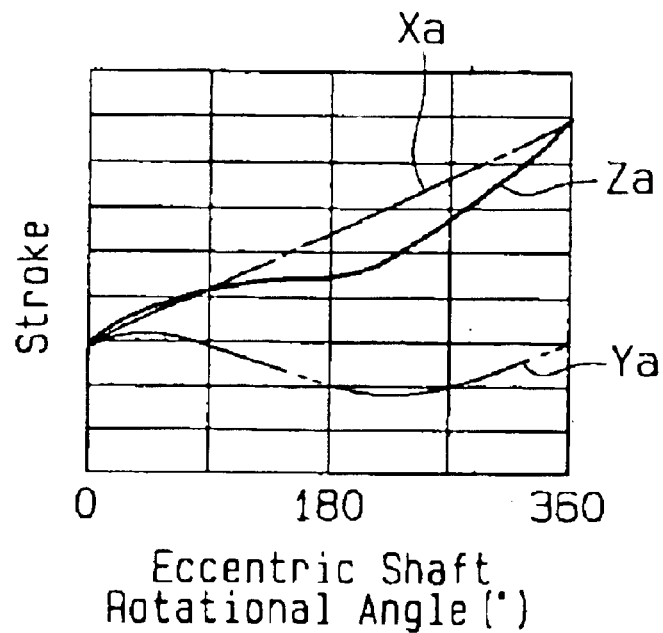
FIGS. 5A and 5B are graphs of a relationship between a rotational angle of the eccentric shaft and the stroke of the cable.
Figure 5B:
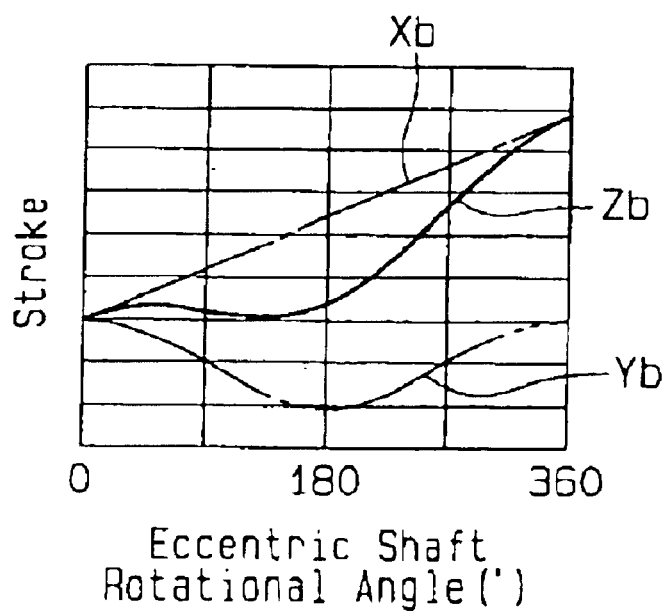

FIGS. 5A and 5B are graphs of the relationship between a rotational angle of the eccentric shaft and the stroke of the cable. FIG. 5A indicates the relationship between the rotational angle of the eccentric shaft 66 and the stroke of the cable 62 with reference to the second embodiment. FIG. 5B indicates the relationship between the rotational angle of the eccentric shaft 66 and the stroke of the cable 62 as a comparative example (the case that the cable cover and the internal gear as the first embodiment are fixed).

In FIG. 5, a line Xa and a line Xb represent the strokes of the cable in which fluctuation due to the revolution of the external gear is disregarded when the eccentric shaft makes one turn. Namely, the lines Xa and Xb represent the strokes of the cable when the external gear turns to the extent of one tooth if the eccentric value of the eccentric shaft is defined as 0. A line Ya and a line Yb represent the strokes of the cable in which the rotational angle (i.e., for one tooth) due to the external gear is disregarded, when the eccentric shaft makes one turn. Namely, they represent relative strokes to the cable cover of the cable caused only by external gear's revolution. A line Za and a line Zb represent actual strokes to the cable cover of the cable and are calculated by adding the line Ya to the line Xa and adding the line Yb to the line Xb.

As shown in FIGS. 5A and 5B, in the second embodiment, since the connecting member 74 is connected to the cable cover 70, the movement value of strokes of the line Ya is reduced than the line Yb of the comparative example. This is originated in that the reciprocating motion caused by revolution of the external gear 67 in the radial direction of the connecting member 74 works so as to set off a relative stroke, which is caused by revolution of the external gear 67, of the cable 62 to the cable cover 70.

In this way, in the electrical parking brake actuator with regard to the second embodiment of the present invention, since the electrical parking brake actuator 61 has the same basic structure as the first embodiment, the effect of the above-described first embodiment can be obtained in the same way. Further, in the present second embodiment, in addition to the effect of the first embodiment, the one end portion 74a is fit to the eccentric part 66a, the other end portion 74b extending to the radial direction from the eccentric shaft 66 has the connecting member 74 connected to the cable cover 70 covering the cable 62 in a sliding way, thus a relative movement, which is caused by revolution of the eccentric shaft 66, of the cable 62 to the cable cover 70 can be decreased. Therefore, load torque's fluctuation, which is caused by such a relative motion, of driving the motor 63 can be decreased.

The above-mentioned embodiment includes an electric current monitoring means for monitoring the current value of the motor, if necessary, and a rotational angle detecting means for detecting the rotational angle of the eccentric shaft. As the rotational angle detecting method, calculation of the rotational angle of the eccentric shaft may be considered by detecting the number of revolution of the motor by providing a sensor such as a hall IC sensor in the rotary shaft of the motor, for example.

Next, the control of thus structured electrical parking brake actuator with regard to the second embodiment of the present invention is explained. A calculating means for identifying the driving power of the motor 63 by operating a signal from the rotational angle detecting means and the electric current monitoring means is structured in the electronic control device (ECU) 7, and the electronic control device 7 controls the electrical parking brake actuator based on the result of the calculating means.

Figure 6:
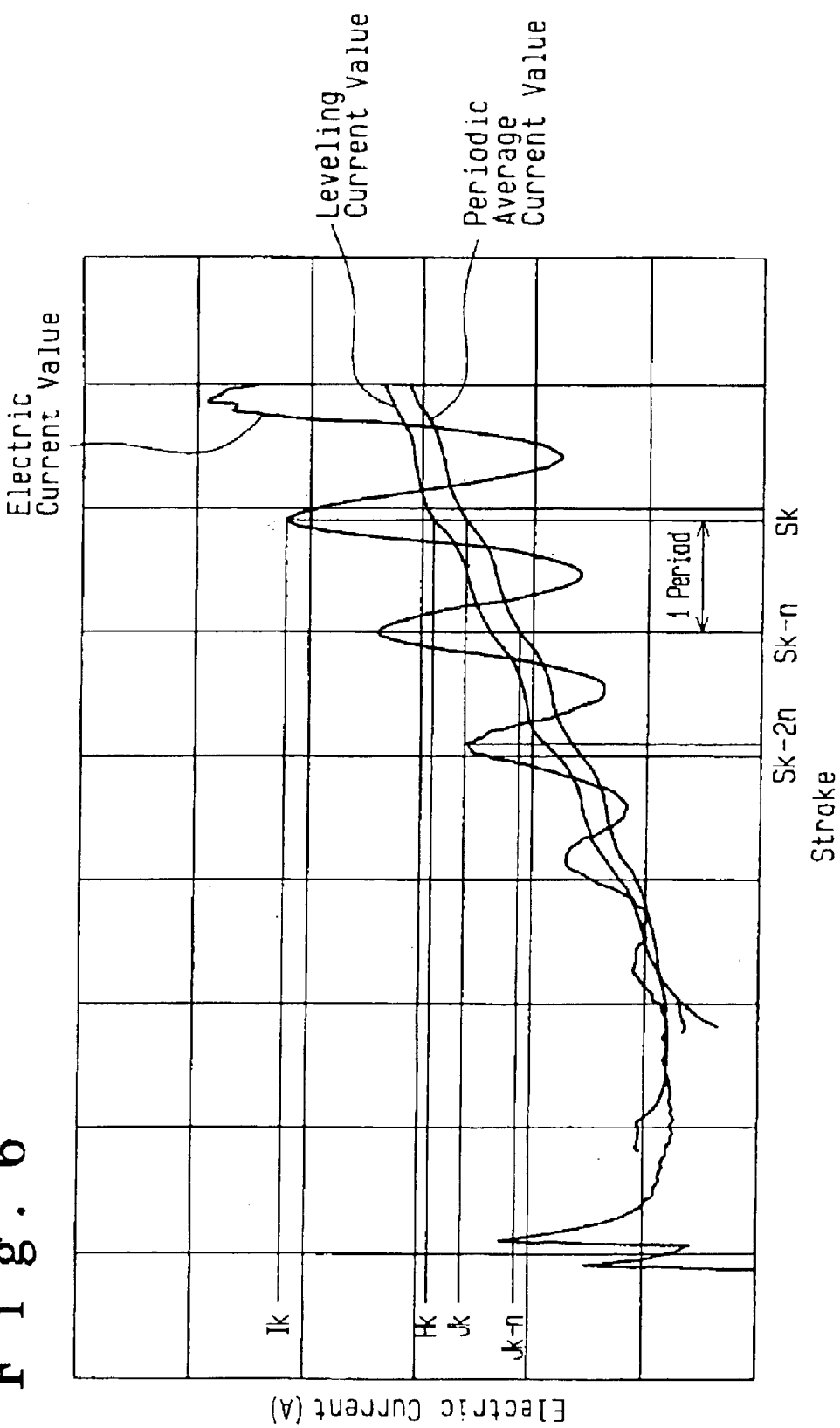
FIG. 6 is a graph of a relationship between the cable stroke and the results of measuring and calculating a current value of a first controlling method of the present invention.
Figure 8:
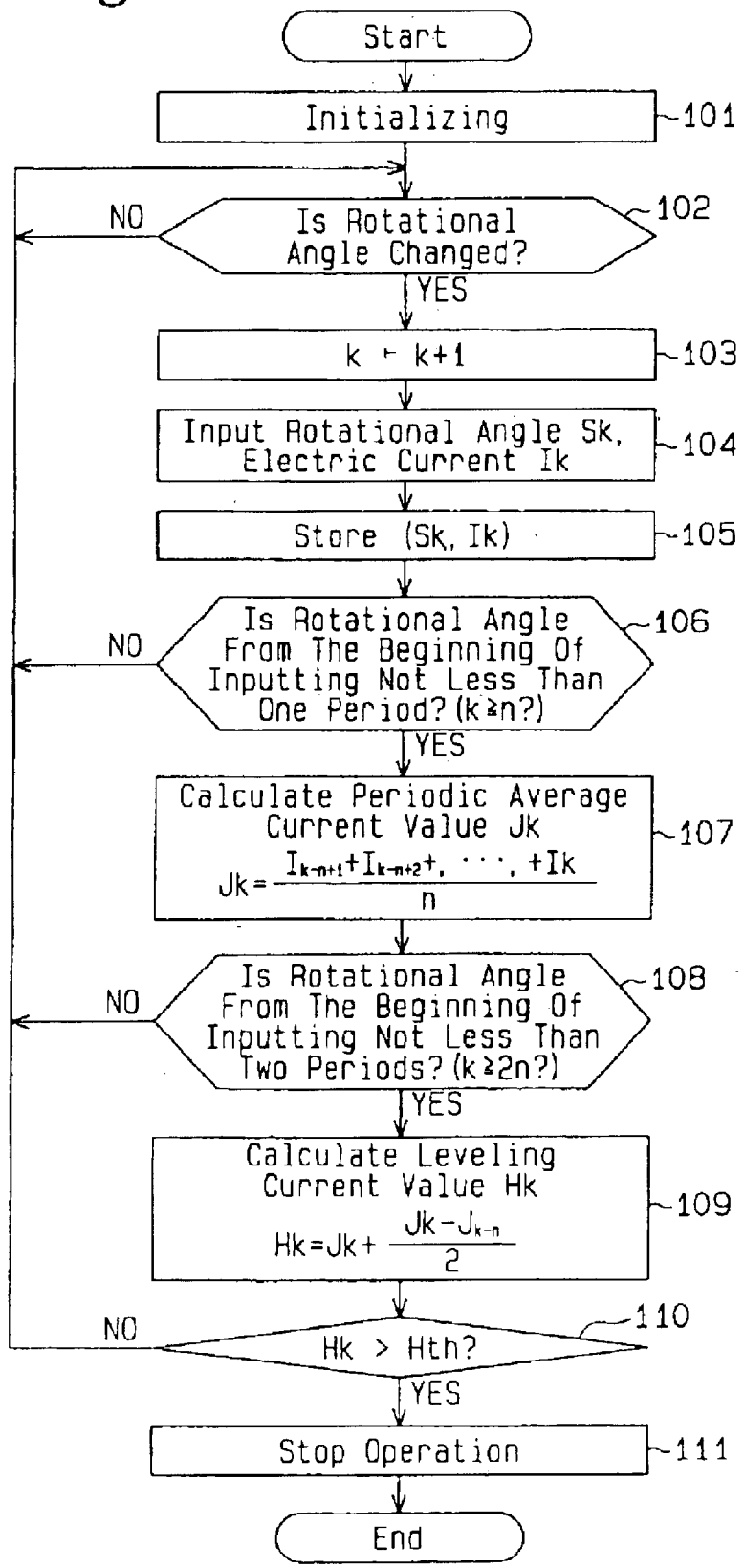
FIG. 8 is a flowchart of the first controlling method of the present invention.

First of all, the first control example is explained using FIG. 6 and FIG. 8. When a signal from the operation switch 8 and the like is sent to the electronic control device 7 and it is tried to give the braking force to the wheels 5 and 6, initializing is performed at a step S101 at first and various types of operation values are cleared. At the same time, a rotational angle Sk of the eccentric shaft 66 and the value of current of the motor 63 are reset (0), and thereafter a step S102 is performed.

At the step S102, it is examined whether or not the rotational angle that is detected by the rotational angle detecting means has changed. When the rotational angle has not changed, the step S102 is repeatedly performed until the rotational angle changes as shown in FIG. 8. If the rotational angle has changed, a step S103 is performed and value to which +1 has added to k is set at the step S103. At a step S104, the rotational angle Sk at the time thereof and an electric current value Ik are input, Then, a value (Sk, Ik) corresponding to the rotational angle Sk and the electric current value Ik is stored at a step S105, and a step S106 is performed.

At the step S106, it is judged whether or not the periods of the rotational angle Sk from the beginning of an input operation are not less than one period (k≧n). If the period of the rotational angle Sk is less than one period, i.e., if the eccentric shaft 66 makes revolution less than one revolution, as shown in FIG. 8, steps S102 to S106 are repeated by each period of controlling the calculating means. If the periods of the rotational angle Sk are not less than one period, i.e., the eccentric shaft 66 makes revolution not less than one revolution, then a step S107 is performed. The character "n" is the number of storing the value (Sk, Ik) within one period at the step S105, and becomes one period if K equals n.

At a step S107, a periodic average current value Ik is calculated, which is an average value of the electric current value Ik for a time up to the point (rotational angle Sk) from the previous point for one period. The term of the periodic average current value Jk means an average value of n current values $(I_{k-n+1}, I_{k-n+2}, \ldots, I_k)$ for a time up to the current point (rotational angle Sk) from the previous point for one period (strictly speaking, a rotational angle $S_{k-n+1}$ that is input at the next control period timing to the previous point for one period). This is to calculate the periodic average current value Jk in which the electric current value Ik fluctuating by each one period is averaged.

At a step S108, it is judged whether or not the periods of the rotational angle Sk from the beginning of the inputting operation are not less than two periods (k≧2n). In the case that the periods of the rotational angle Sk are less than two periods, i.e., the eccentric shaft 66 makes revolution less than two revolutions, as shown in FIG. 8, steps S102 to S108 are repeated by each period of the calculating means. If the periods of the rotational angle Sk are not less than two periods, i.e., the eccentric shaft 66 makes revolution not less than two revolutions, a step S109 is performed.

At the step S109, a leveling current value Hk at the current point of adding a half value of a value, in which a periodic average current value (Jk−n), for a time up to the previous point for one period from the previous point for two periods, is subtracted from the periodic average current value Jk for a time up to the current point (rotational angle Sk) from the previous point for one period, to the periodic average current value Jk for a time up to the current point (rotational angle Sk) from the previous point for one period is calculated. Namely, the periodic average current value Jk for a time up to the current point (rotational angle Sk) from the previous point for one period means the current value which has been leveled at the previous point for a half period from the current point of the rotational angle Sk. If this periodic average current value Jk is defined instantly as a leveling current value Hk at the current point of the rotational angle Sk, the leveling current value Hk becomes a leveled current value at the point of a previous half period from the current point of the rotational angle Sk. Further, the electric current value Ik increases in accordance with the cable stroke. Therefore, it is required to add a predetermined increment value to the periodic average current value Jk at the point of a previous half point in order to calculate the leveling current value Hk at the current point. This predetermined increment value is assumed to be nearly a half value of the value, in which the periodic average current value (Jk−n) for a time up to the previous point for one period from the previous point for two periods has been subtracted from the periodic average current value Jk at the current point (rotational angle Sk) from the previous point for one period. Therefore, if the leveling current value Hk is calculated at the current point of the rotational angle Sk in this way, the leveling current value Hk can be obtained in a highly precise way.

At a step S110, it is judged whether or not the leveling current value Hk is greater than the predetermined threshold value Hth. This threshold value Hth is defined as a current value at the time that the tensile strength of the cable 62 is added to the parking brake units 3 and 4 and enough braking force can be given to the wheels 5 and 6. Therefore, if the leveling current value Hk is greater than the threshold value Hth, it is supposed that the braking force is given to the wheels 5 and 6 sufficiently, a step S111 is performed, and then the operation is terminated. In the case that the leveling current value Hk is less than the threshold value Hth, it is supposed that the braking force is not given to the wheels 5 and 6 sufficiently, and steps S102 to S111 are repeated by each controlling period.

FIG. 6 is a graph of the relationship between the cable stroke and the results of measuring and operating the electric current value Ik of the present first control embodiment. The horizontal shaft represents the rotational angle Sk of the eccentric shaft 66, i.e., the stroke of the cable 62, and the vertical shaft represents the value of the electric current value Ik, the periodic average current value Jk, and the leveling current value Hk. In FIG. 6, the curve of the leveling current values still fluctuates due to slight extension of the cable 62 and an influence of torque of the motor 63. (Ideally, it should be a straight line)

In this way, in the first controlling embodiment of the present invention, it is possible to judge whether or not the motor 63 is stopped precisely and firmly by only detecting and calculating the rotational angle Sk of the eccentric shaft 66 and the electric current value Ik of the motor 63. Therefore, it is possible to judge whether or not the operation of winding up precisely is completed without requesting an expensive cable tensile strength detecting device.

Figure 9:
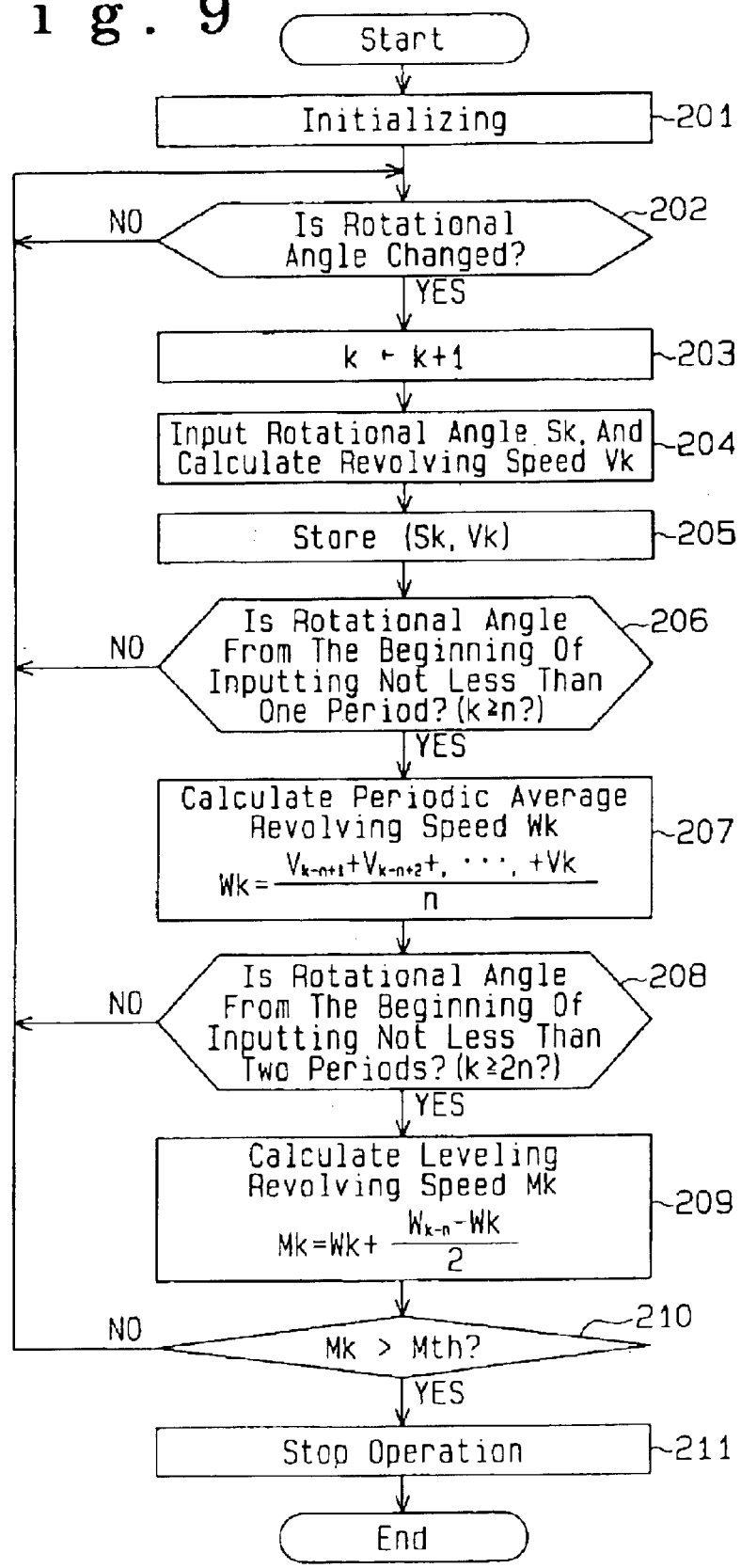
FIG. 9 is a flowchart of the second controlling method of the present invention.

Then, the second controlling embodiment is explained with reference to the FIG. 7 and FIG. 9. If the signal from the operation switch 8 and the like is sent to the electronic control device 7 and the braking force is given to the wheels 5 and 6, an initializing operation is performed at a step S201 at first, various types of calculating values are cleared, the rotational angle Sk of the eccentric shaft 66 is also reset (0), and then a step S202 is performed.

At the step S202, it is examined whether or not the rotational angle which is detected by the rotational angle detecting means has changed. If the rotational angle has not changed, the step S202 is repeated until the rotational angle changes as indicated in FIG. 9. If the rotational angle has changed, a step S203 is performed, the value of adding +1 to k is set at the step S203, and the rotational angle Sk at the point thereof is input at a step S204 and also a revolving speed Vk which is calculated from variable values by each unit time of the rotational angle Sk is calculated. Further, the value (Sk, Vk) corresponding to the rotational angle Sk and the revolving speed Vk is stored at a step S205, and then a step S206 is performed.

At the step S206, it is judged whether or not the period of the rotational angle Sk from the beginning of the input operation is not less than one period ($k \geq n$). If the period of the rotational angle Sk is less than one period, i.e., if the eccentric shaft 66 makes revolution less than one revolution, as shown in FIG. 9, steps S202 to S206 are repeated by each period of controlling the calculating means. When the periods of the rotational angle Sk are not less than one period, i.e., the eccentric shaft 66 makes revolution not less than one revolution, then a step S207 is performed. The character "n", in the same way as the first controlling embodiment, is the number of storing the value (Sk, Vk) within one period at the step S205, and becomes one period if K equals n.

At a step S207, a periodic average revolving speed Wk is calculated, which is an average value of the revolving speed Vk for a time up to the point (rotational angle Sk) from the previous point for one period, is calculated. The term of the periodic average revolving speed Wk means an average value of n revolving speeds ($V_{k-n+1}, V_{k-n+2}, \ldots, V_k$) for a time up to the current point (rotational angle Sk) from the previous point for one period (strictly speaking, a rotational angle $S_{k-n+1}$ that is input at the next control period timing to the previous point for one period). This is to calculate the periodic average revolving speed Wk in which the revolving speed Vk fluctuating by each one period is averaged At a step S208, it is judged whether or not the periods of the rotational angle Sk from the beginning of the inputting operation are not less than two periods ($k \geq 2n$). In the case that the periods of the rotational angle Sk are less than two periods, i.e., the eccentric shaft 66 makes revolution less than two revolutions, as shown in FIG. 9, steps 202 to 208 are repeated by each period of the calculating means. If the periods of the rotational angle Sk are not less than two periods, i.e., the eccentric shaft 66 makes revolution not less than two revolutions, a step S209 is performed.

At the step S209, a leveling revolving speed Mk is calculated, in which a half value of a value, in which a periodic average revolving speed Wk, for a time up to the current point (rotational angle Sk) from the previous point for one period, is subtracted from the periodic average revolving speed Wk-n for a time up to the previous point for one period from the previous point for two periods, is subtracted from the periodic average revolving speed Wk for a time up to the current point (rotational angle Sk) from the previous point for one period. Namely, the periodic average revolving speed Wk for a time up to the current point (rotational angle Sk) from the previous point for one period means the revolving speed which has been leveled at the time of the previous point for a half period from the current point of the rotational angle Sk. If this periodic average revolving speed Wk is defined instantly as a leveling revolving speed Mk at the current point of the rotational angle Sk, the leveling revolving speed Mk becomes a leveled revolving speed at the point of a previous half period from the current point of the rotational angle Sk. Further, the revolving speed Vk decreases in accordance with the cable stroke. Therefore, it is required to subtract a predetermined decrement value from the periodic average revolving speed Wk at the point of a previous half point in order to calculate the leveling revolving speed Mk at the current point. This predetermined decrement value is assumed to be nearly a half value of the value, in which the periodic average revolving speed Wk for a time up to the current point (rotational angle Sk) from the previous point for one period has been subtracted from the periodic average revolving speed (Wk-n) up tp the previous point for one period from the previous point for two period. Therefore, if the leveling revolving speed Mk is calculated at the current point of the rotational angle Sk in this way, the leveling revolving speed Mk can be obtained in a highly precise way.

At a step S210, it is judged whether or not the leveling revolving speed Mk is greater than the predetermined threshold value Mth. This threshold value Mth is defined as a revolving speed at the time that the tensile strength of the cable 62 functions to the parking brake units 3 and 4 and enough braking force can be given to the wheels 5 and 6. Therefore, if the leveling revolving speed Mk is smaller than the threshold value Mth, it is supposed that the braking force is given to the wheels 5 and 6 sufficiently, a step S211 is performed, and then the operation is terminated. In the case that the leveling revolving speed Mk is not less than the threshold value Mth, it is supposed that the braking force is not given to the wheels 5 and 6 sufficiently, and steps S202 to S210 are repeated by each controlling period.

Figure 7:
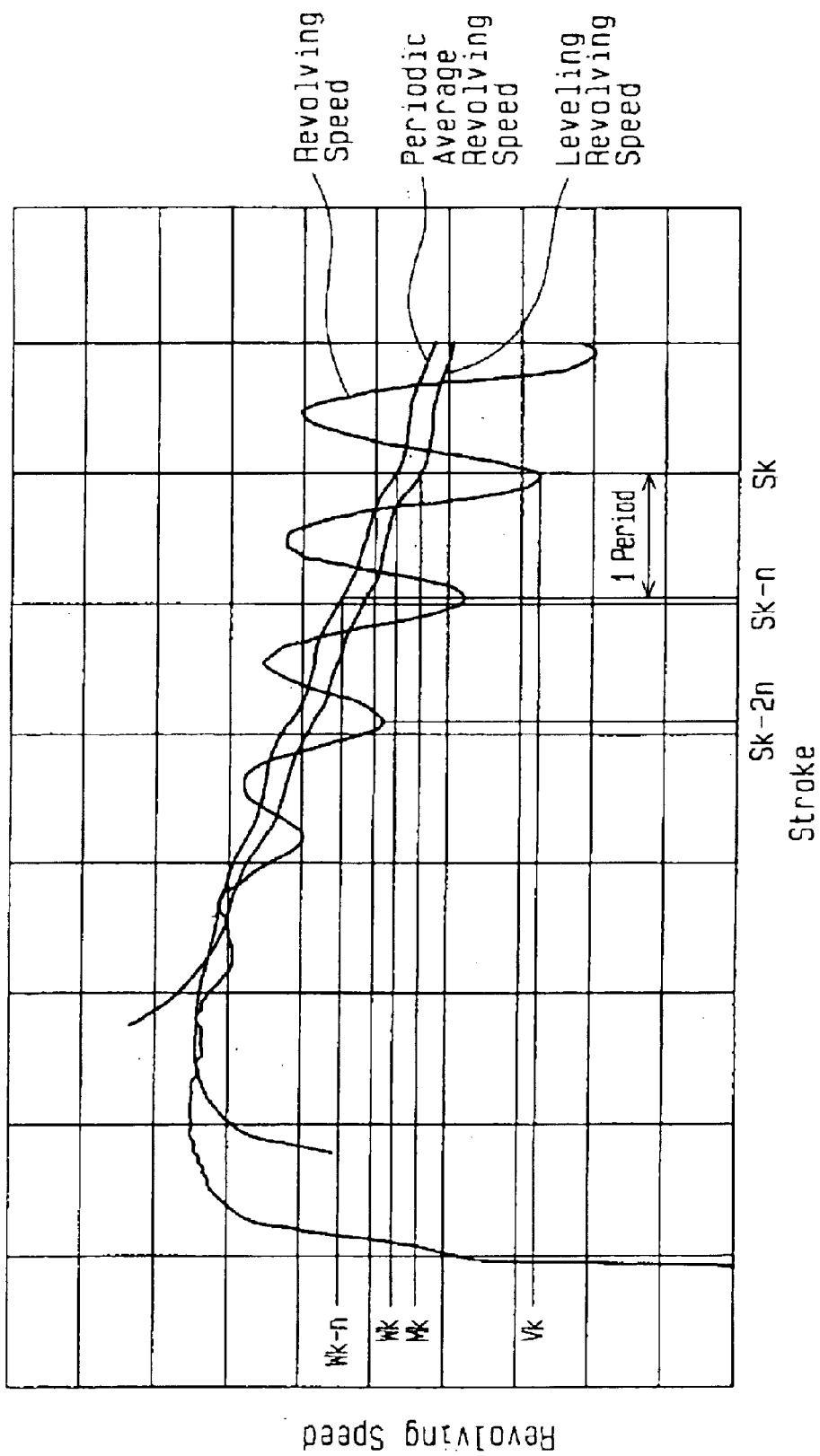
FIG. 7 is a graph of a relationship between the cable stroke and the results of measuring and calculating a revolving speed of a second controlling method of the present invention.

FIG. 7 is a graph of the relationship between the cable stroke and the results of measuring and operating the revolving speed Vk of the present second control embodiment. The horizontal shaft represents the rotational angle Sk of the eccentric shaft 66, i.e., the stroke of the cable 62, and the vertical shaft represents the value of the revolving speed Vk, the periodic average revolving speed Wk, and the leveling revolving speed Mk. In FIG. 7, the curve of the leveling revolving speed still fluctuates due to slight extension of the cable 62 and an influence of torque of the motor 63. (Ideally, it should be a straight line).

In this way, in the second controlling embodiment of the present invention, it is possible to judge whether or not the motor 63 is stopped precisely and firmly by only detecting and calculating the rotational angle Sk of the eccentric shaft 66 and the revolving speed Vk of the motor 63. Therefore, in the present second controlling embodiment in addition to the effects of the above-mentioned first control embodiment, a current monitoring means of the motor is not required and a more inexpensive device can be provided. At this time, the revolving speed of the motor has a characteristic of changing due to an applied voltage, thus it is possible to improve the precision quality to identify whether or not the driving power of the motor is stopped by adding a compensation voltage suitably in the case that the second controlling embodiment of the present invention is adopted.

Then, the third controlling embodiment is explained. If the signal from the operation switch 8 and the like is sent to the electronic control device 7 and the braking force is given to the wheels 5 and 6, an initializing operation is performed, various types of calculating values are cleared, and the electric current value Ik of the motor 63 is also reset (0). Then, the volume of current changes dIkt of the electric current value Ik is calculated and the number of extreme values Nk of the maximum and minimum values of the electric current value Ik is counted up one after another using this volume of current changes dIkt. Further, the number of extreme values Nk and the predetermined threshold value Nth are compared. This threshold value Nth is defined as the number of extremes of the electric current value Ik which is generated until the tensile strength of the cable 62 functions to the parking brake units 3 and 4 and enough braking force can be given to the wheels 5 and 6. Therefore, if the number of extreme values Nk is larger than the threshold value Nth, it is supposed that the braking force is given to the wheels 5 and 6 sufficiently, and then the operation is terminated. Accordingly, this third controlling embodiment can control the braking force effectively if the threshold value Nth is defined so as to be still greater value.

Further, in this third controlling embodiment, the current value difference Pt between the maximum and minimum values of the electric current value Ik within the predetermined time is calculated and then the abnormality is judged based on the results by comparing this current value difference Pt with a threshold value Pth. Namely, it is judged whether or not a condition in which the current value difference Pt is lower than the threshold value Pth continues for a predetermined time. If the condition in which the current value difference Pt is lower than the threshold value Pth continues for a predetermined time, in spite of winding up the cable 62, the load of the motor 63 cannot be lifted, and thus it may be thought that the failure as cutting the cable 62 is caused. Therefore, the control of the electrical vehicle parking brake device is released and also an alarm is sounded by lighting up an alarm lamp (indicating lamp 9).

In this way, in the third embodiment of the present invention, the electric current value Ik of the motor 63 is detected, the volume of current changes dIkt is calculated therefrom, the number of extreme values Nk of the maximum and minimum values of the electric current value Ik is calculated using this volume of current changes dIkt, thus it is possible to judge whether or not the driving power of the motor 63 is stopped in a precise way. Therefore, it is possible to judge inexpensively whether or not a precise winding up operation is completed because an expensive cable tensile strength detection device is not required and further the rotational angle detecting means is not required. Furthermore, a special sensor is not required and abnormality can be judged easily using a simple device since abnormality of the electrical vehicle parking brake device is judged precisely by calculating only the current value difference Pt between the maximum and minimum values of the electric current value Ik within a predetermined time.

According to the electrical vehicle parking brake device with regard to the present invention, since the end gear series of the gear mechanism uses the differential gear mechanism and also winds up the cable in a circular way, unlike the conventional direct type electrical vehicle parking brake device, the present invention uses only the moving screw and the mechanical portion of the nut side member, but does not need a length at least two times as long as the maximum stroke of the cable. Therefore, the size thereof can be reduced in the cable axial direction as the whole electrical vehicle parking brake device and the degree of freedom of mounting in the vehicle can be increased. Further, even if the maximum stroke is different due to the required specification of the vehicle, it is not required to change the size of the electrical vehicle parking brake device, thus contribution for improving flexibility can be made.

Preferably, the present invention can be an electrical vehicle parking brake device in which the differential gear mechanism includes an eccentric shaft including a concentric portion and an eccentric portion and rotated by the driving power of the motor, an external gear supported by one of the concentric portion and the eccentric portion, and an internal gear supported by the other of the concentric portion and engaged with the external gear; the differential gear mechanism is a K-H-V type planetary gear mechanism in which one of the external gear and the internal gear is fixed, the other of the external gear and the internal gear makes one revolution around the one of the external and external gears in accordance with the rotation of the eccentric shaft whereby the differential gear mechanism revolves to an extent of a difference in tooth number between the internal gear and the external gear in a reverse direction to the revolution direction; and the cable is wound up by the other of the external gear and the internal gear.

More preferably, the present invention can be an electrical vehicle parking brake device which further comprises a connecting member one end being engaged with the eccentric portion of the eccentric shaft and the other end extending in radial direction from the eccentric portion and connected to a cable cover which covers the cable in a sliding way, when connecting member is supported around the vicinity of the other end and is movable in radial direction but is fixed against rotation.

With regard to the present invention, the volume of moving the cable relatively towards the cable cover can be reduced, which is caused by revolution of the eccentric shaft. Namely, the external gear winds up the cable while revolving due to revolution of the eccentric shaft. However, if the cable cover is fixed at this stage, the relative motion of the cable is caused towards the cable cover unavoidably, working together with revolution of such an external gear. This type relative motion may vary load torque of the driving power of the motor, thus the volume of this relative motion may preferably be small. However, if the cable cover is connected to the other end of the above-mentioned connecting member, as one end of the connecting member makes an eccentric motion due to revolution of the eccentric shaft, the other end of the connecting member, i.e., the cable cover, also moves in the radial direction working together with its eccentric motion. Therefore, the cable cover moves in the direction of setting off the relative motion of the cable to the cable cover as the external gear revolves. According to the above-mentioned structure, a relative motion of the cable to the cable cover can be reduced. Therefore, fluctuation of a load torque of the driving power of the above-mentioned motor can be reduced.

More preferably, the present invention can be an electrical vehicle parking brake device which further comprises an electric current monitoring means for monitoring an electric current value of the motor; a rotational angle detecting means for detecting a rotational angle of the eccentric shaft; and a calculating means for defining one revolution of the eccentric shaft as one period by recognizing one revolution of the eccentric shaft from the rotational angle detected by the rotational angle detecting means, calculating a periodic average current value, which is an average value of electric currents monitored by the electric current monitoring means for a time up to its point from a previous point for one period, by each control period, calculating a current leveling current value which is leveled based on the periodic calculation electric current values which have already been calculated before and now, and stopping providing braking force of the motor based on results by comparing the leveling current value with a predetermined threshold value.

In general, the decision of judging whether or not the operation of winding up the electrical vehicle parking brake device is completed is made by judging whether or not the tensile strength of the cable detected by a cable tensile strength detecting device has reached a value not less than a predetermined value. However, since this type of electrical vehicle parking brake device is expensive in general, the decision of judging whether or not the above-mentioned operation of winding up is completed is preferably made using other type of detecting device. Accordingly, if a characteristic in which the driving power of the motor corresponding to the tensile strength is proportional to the value of electric currents flowing in the motor is utilized, the decision of judging whether or not the operation of winding up can be made by introducing an inexpensive electric current monitoring device for monitoring the value of electric currents of the motor and by judging whether or not this type of electric current monitoring device has reached a value not less than the predetermined value. However, in the case that a K-H-V type planetary gear mechanism is adopted as a differential gear mechanism, fluctuation of torque of the motor is caused, which is caused by revolution of the external gear as explained in the above-mentioned description. Therefore, the value of electric currents of the motor fluctuates by each period corresponding to revolution of the external gear, i.e., a period of an eccentric shaft which makes one revolution, thus precise decision of judging whether or not the operation of winding up is completed cannot be made, if the value of electric currents of the motor is compared with the predetermined value.

With regard to the present invention, a view point in which the value of electric currents fluctuates by each period is considered, a periodic average electric current value which is an average value of the electric current for one period is calculated one after another by each control period by utilizing its periodic characteristic, a leveled electric current value in which the values of electric currents are leveled based on its periodic average electric current value is calculated, and then the driving power of the motor is stopped due to results by comparing this leveled electric current value with a predetermined threshold value. Accordingly, the decision of judging whether or not the operation of winding up has been completed can be made real inexpensively and precisely without using expensive cable tensile strength detecting device.

Further, the present invention may be an electrical parking break device in which the electrical parking break device includes a rotational angle detecting means for detecting a rotational angle of the eccentric shaft; and a calculating means for calculating a revolving speed calculated from a change value by each unit time of a rotational angle detected by the detecting means, defining one revolution of the eccentric shaft as one period by recognizing one revolution of the eccentric shaft, calculating a period average revolving speed, which is an average value of the revolving speed for a time up to its point from a previous point for one period, by each control period, calculating a current leveling revolving speed which is leveled based on the period calculating revolving speeds which have already been calculated before and now, and stopping providing braking force of the motor based on results by comparing the leveling revolving speed with a predetermined threshold value.

With regard to the present invention, for judging whether or not the operation of winding up is completed, the revolving speed of the eccentric shaft is adopted as an applying physical quantity. This is based on a characteristic in which the revolving speed of the motor decreases as torque of the driving power of the motor corresponding to the tensile strength of the cable increases. Accordingly, the decision of judging whether or not the operation of winding up has been completed can be made real inexpensively and precisely without using expensive cable tensile strength detecting device. Furthermore, more inexpensive device can be provided since the electric current monitoring means of the motor is not needed.

Further, the present invention can be an electrical parking break device in which the electrical parking break device includes an electric current monitoring means for monitoring an electric current value of the motor; a calculating means for calculating an electric current change value monitored by the electric current monitoring means, counting a number of extreme value of the maximum and minimum values of the electric current value from the electric current change value, and stopping providing braking force of the motor based on results by comparing a total of the extreme values with a predetermined threshold value.

With regard to the present invention, a characteristic, in which extreme values of the electric currents of the motor, which is caused for a time up to the completion of winding up from the beginning of winding up, corresponds to the number of revolving of the eccentric shaft between them, is utilized. Namely, since the number of revolution of the eccentric shaft for a time up to the completion of winding up from the beginning of winding up has been identified in advance, the extreme numbers of the electric current are counted up, and the decision that the operation of winding up has been completed is made if the total of the extreme numbers attains the specified threshold value. Accordingly, it is made real inexpensively and precisely to judge whether or not the operation of winding up has been completed without using expensive cable tensile strength detecting device.

More preferably, the present invention can be an electrical parking break device in which the calculating means includes an abnormality judging means for calculating a difference between electric current values between the maximum and minimum values within a predetermined time and judging an abnormality based on results by comparing the difference between electric current values with a predetermined threshold value. Accordingly, it is made real inexpensively and precisely to judge whether or not abnormality is caused without using the rotational angle detecting means and the tensile strength detecting device of the cable.

As explained in this way, according to the present invention, in the electrical vehicle parking brake device for controlling the braking force to the wheels by transmitting the driving power of the motor using the cable at the time of parking the vehicle, the size towards the cable shaft can be decreased and the electrical vehicle parking brake device which can improve the degree of freedom of mounting in the vehicle can be provided.

What we claim is:

1. An electrical vehicle parking brake device for controlling braking force to a wheel by driving power of a motor transmitted by way of a gear mechanism and a cable, comprising:
    an end gear series of said gear mechanism which includes a differential gear mechanism and winds up said cable in a circular way;
    wherein said differential gear mechanism includes an eccentric shaft including a concentric portion and an eccentric portion rotated by the driving power of said motor, an external gear supported by one of said concentric portion and said eccentric portion, and an internal near supported by the other of said concentric portion and eccentric portion a engaged with said external gear;
    said differential gear mechanism is a K-H-V type planetary gear mechanism in which one of said external gear and said internal gear is fixed, the other of said external gear and said internal gear makes one revolution around the one of the external and internal gears in accordance with the rotation of said eccentric shaft whereby said differential gear mechanism revolves to an extent of a difference in tooth number between said internal gear and said external gear in a reverse direction to the revolution direction;

said cable is wound up by said the other of said external gear and said internal gear; and a connecting member one end being engaged with said eccentric portion of said eccentric shaft and the other end extending in radial direction from the eccentric portion and connected to a cable cover which covers said cable in a sliding way, whereby the connecting member is supported around the vicinity of the other end and is movable in radial direct but is fixed against rotation.

2. An electrical vehicle parking brake device according to claim 1 further comprising an electric current monitoring means for monitoring an electric current value of said motor; a rotational angle detecting means for detecting a rotational angle of said eccentric shaft; and a calculating means for defining one revolution of said eccentric shaft as one period by recognizing one revolution of said eccentric shaft from said rotational angle detected by said rotational angle detecting means calculating a periodic average current value, which is an average value of electric currents monitored by said electric current monitoring means for a time for a time up to a current point from a previous point for one period, by each control period, calculating a current leveling current value which is leveled based on the periodic calculation electric current values calculated at present and/or past, and stopping providing braking force of said motor based on results by comparing said leveling current value with a predetermined threshold value.

3. An electrical vehicle parking brake device according to claim 1 further comprising a rotational angle detecting means for detecting a rotational angle of said eccentric shaft; and a calculating means for calculating a revolving speed calculated from a change value by each unit time of a rotational angle detected by said detecting means, defining one revolution of said eccentric shaft as one period by recognizing one revolution of said eccentric shaft, calculating a periodic average revolving speed, which is an average value of said revolving speed for a time for a time up to a current point from a previous point for one period, by each control period, calculating a current leveling revolving speed which is leveled based on the periodic calculation revolving speeds calculated at present and/or past, and stopping providing braking force of said motor based on results by comparing said leveling revolving speed with a predetermined threshold value.

4. An electrical vehicle parking brake device according to claim 1 further comprising an electric current monitoring means for monitoring an electric current value of said motor; a calculating means for calculating an electric current change value monitored by said electric current monitoring means, counting a number of extreme value of a maximum and minimum value of said electric current value from said electric current change value, and stopping providing braking force of said motor based on results by comparing a total of said extreme values with a predetermined threshold value.

5. An electrical vehicle parking brake device according to claim 4, further comprising an abnormality judging means for calculating a difference between electric current values between said maximum and minimum values within a predetermined time and judging an abnormality based on results by comparing said difference between electric current values with the predetermined threshold value.

6. An electrical vehicle parking brake device for controlling braking force to a wheel by driving power of a motor transmitted by way of a gear mechanism and a cable, comprising:

an end gear series of said gear mechanism which includes a differential gear mechanism and winds up said cable in a circular way;

wherein said differential gear mechanism includes an eccentric shaft including a concentric portion and an eccentric portion is rotated by the driving power of said motor, an external gear supported by one of said concentric portion and said eccentric portion, and an internal gear supported by the other of said concentric portion and eccentric portion an engaged with said external gear;

said differential gear mechanism is a K-H-V type planetary gear mechanism in which one of said external gear and said internal gear is fixed, the other of said external gear and said internal gear makes one revolution around the one of the external and internal gears in a accordance with the rotation of said eccentric shaft whereby said differential gear mechanism revolves to an extent of a difference in tooth number between said internal gear and said external gear in a reverse direction to the revolution direction;

said cable is wound up by said the other of said external gear and said internal gear;

a rotational angle detecting means for detecting a rotational angle of said eccentric shaft; and a calculating means for calculating a revolving speed calculated from a change value by each unit time of a rotational angle detected by said detecting means, defining one revolution of said eccentric shaft as one period by recognizing one revolution of said eccentric shaft, calculating a periodic average revolving speed, which is an average value of said revolving speed for a time for a time up to a current point from a previous point for one period, by each control period, calculating a current leveling revolving speed which is leveled based on the periodic calculation revolving speeds calculated at present and/or past, and stopping providing braking force of said motor based on results by comparing said leveling revolving speed with a predetermined threshold value.

7. An electrical vehicle parking brake device for controlling braking force to a wheel by driving power of a motor transmitted by way for a gear mechanism and a cable, comprising:

an end gear series of said gear mechanism which includes a differential gear mechanism and winds up said cable in a circular way;

wherein said differential gear mechanism includes an eccentric shaft including a concentric portion and an eccentric portion rotated by the driving power of said motor, an external gear supported by one of said concentric portion and said eccentric portion, and an internal gear supported by the other of said concentric portion and eccentric portion and engaged with said external gear;

said differential gear mechanism is a K-H-V type planetary gear mechanism in which one of said external gear and said internal gear is fixed, the other of said external gear and said internal gear makes one revolution around the one of the external and internal gears in accordance with the rotation of said eccentric shaft whereby said differential gear mechanism revolves to an extent of a difference in tooth number between said internal gear and said external gear in a reverse direction to the revolution direction;

said cable is wound up by said the other of said external gear and said internal gear;

an electric current monitoring means for monitoring an electric current value of said motor;

a rotational angle detecting means for detecting a rotational angle of said eccentric shaft; and a calculating means for defining one revolution of said eccentric shaft as one period by recognizing one revolution of said eccentric shaft from said rotational angle detected by said rotational angle detecting means calculating a periodic average current value, which is an average value of electric currents monitored by said electric current monitoring means for a time for a time up to a current point from a previous point for one period, by each control period, calculating a current leveling current value which is leveled based on the periodic calculation electric current values calculated at present and/or past, and stopping providing braking force of said motor based on results by comparing said leveling current value with a predetermined threshold value.

* * * * *